Figure 1:
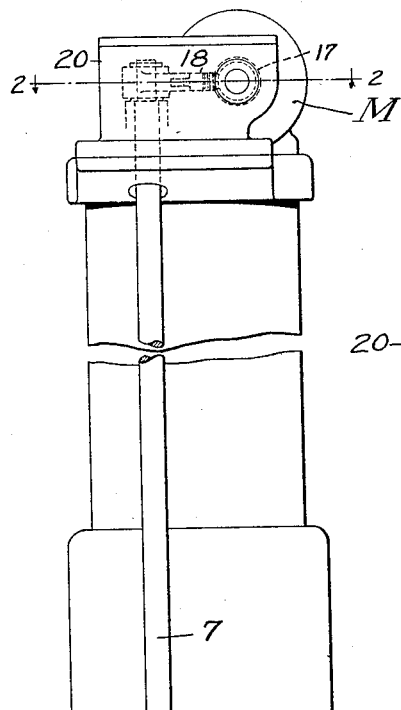

Aug. 30, 1932.                D. C. KLAUSMEYER                1,875,017
                          DRILL COLUMN CLAMPING MEANS
                   Filed March 12, 1929            4 Sheets-Sheet 1

Inventor
David C. Klausmeyer
By Attorneys
Nathan & Bowman

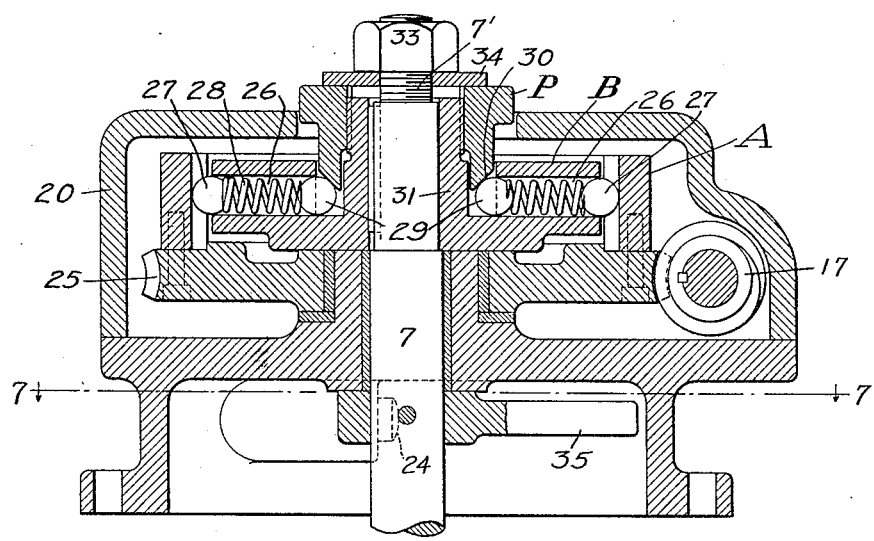
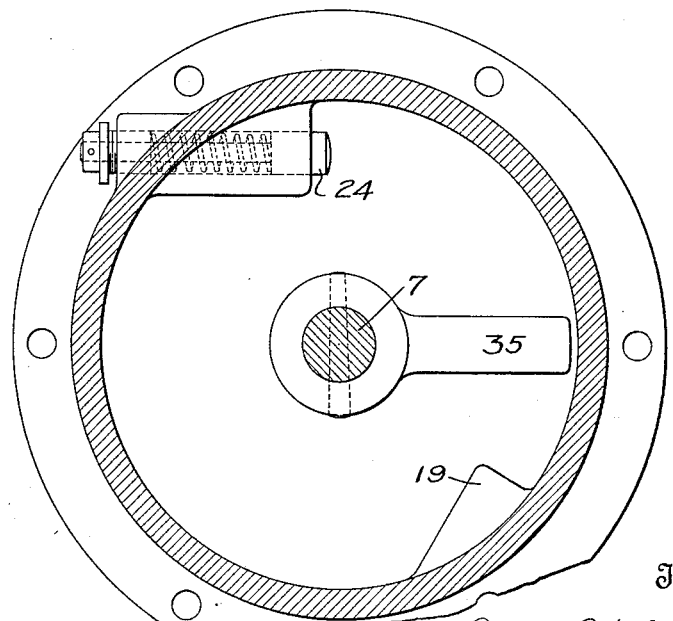

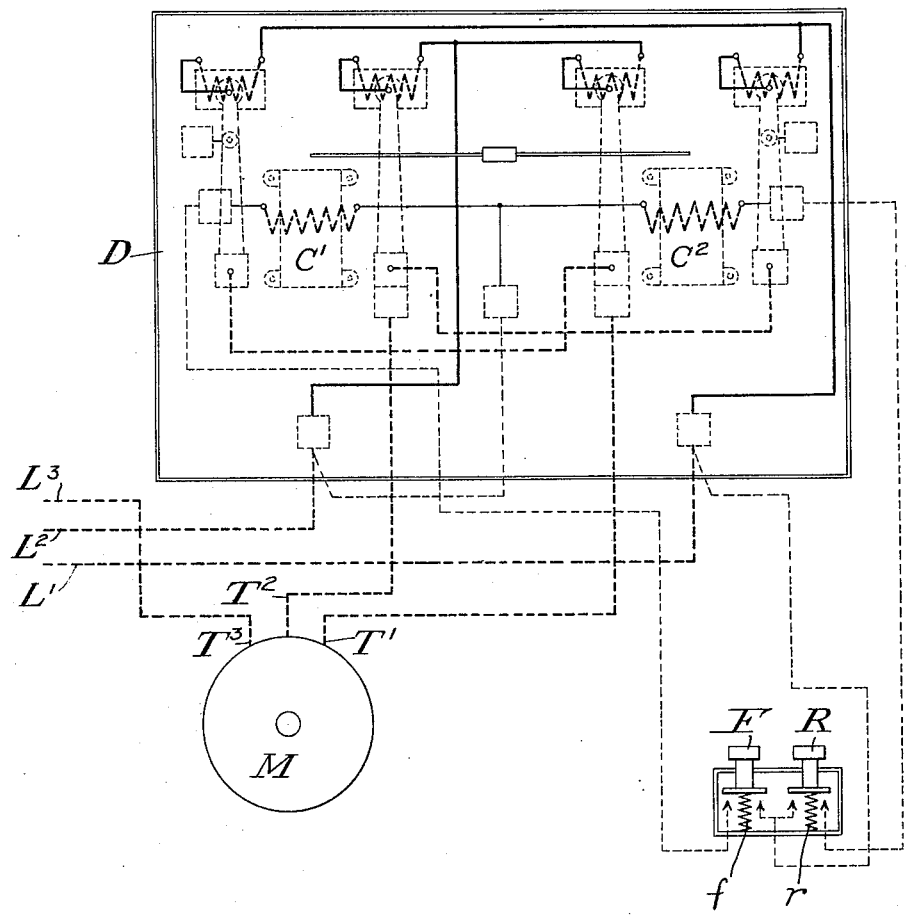

Patented Aug. 30, 1932

1,875,017

UNITED STATES PATENT OFFICE

DAVID C. KLAUSMEYER, OF CINCINNATI, OHIO, ASSIGNOR TO THE CINCINNATI BICKFORD TOOL CO., OF OAKLEY, CINCINNATI, OHIO, A CORPORATION OF OHIO

DRILL COLUMN CLAMPING MEANS

Application filed March 12, 1929. Serial No. 346,462.

This invention relates to clamping mechanisms such as may be used for example, to clamp a movable portion of a machine tool to a stationary portion thereof during a machining operation.

An object of this invention is to render available a new method of actuating a clamp, wherein an operator manually initiates a flow of power to an impositive clamp actuating means, manually maintains said flow for an indefinite period during which the clamp actuating means is actuated and finally overcome by resistance, and in which the flow of power is automatically discontinued as soon as the operator ceases manually to maintain it continuous.

Another object of this invention is to render available a power actuated clamping mechanism, embodying a manual control, and so to construct and arrange the power means and the manual control therefor that both the clamp and the power means will be protected against damage due to a continued application of power after the clamp has been fully closed or fully opened.

Another object of the invention is to provide a power actuated clamping mechanism in which the force capable of being transmitted to the clamp during the clamping action will be substantially less than the force capable of being transmitted thereto during an unclamping action, whereby the possibility of so tightly setting the clamp that it cannot be opened by the power means is precluded.

A further object is to provide a clamping mechanism and power actuating means therefor so constructed and arranged that the prime mover of said power actuated means may continue to operate after the clamping or unclamping action has been completed, without injury to the clamp device, the clamp actuating mechanism or the prime mover.

This invention also proposes so to construct a power actuated clamping means that the prime mover thereof may be rendered ineffective by a complete closing of the clamp; to provide a limit stop to arrest the movement of the clamp actuating means should (by reason of wear or otherwise) the clamp fail to be tightened upon a normal actuation thereof, and to provide a cushioning means to limit the movement of the clamp actuating means in clamp opening movement.

Other objects and advantages will be in part indicated in the following description and in part rendered apparent therefrom in connection with the annexed drawings.

The objects of this invention have been attained by the provision of a clamp mechanism comprising a contractile and expansile element adapted to be actuated to effect clamping and unclamping action by forward and reverse movements of an oscillatory shaft. Other forms of clamp elements, however, may be employed. A reversible overload electric motor is connected with said shaft and the flow of electric current to said motor, to effect forward and reverse rotation, is controlled by manually actuated switches which are so constructed as normally to open to break the circuit to said motor and which may be maintained closed, to permit a flow of current to the motor, only by continuous action of an operator. The switches are preferably of the spring opening push-button type and immediately the operator removes his finger from the button the switch automatically opens and the flow of electric current to the motor is discontinued. The motor is so wound and insulated as to be capable of being maintained under the influence of the electric current, while stalled, for a period of three minutes or more which is longer than an operator could hold the switch closed without experiencing extreme fatigue if not actual pain. In other words it would be impossible for the operator to hold the switch closed sufficiently long to cause overheating or damage to the motor.

Inasmuch as the action of the clamp is almost instantaneous (requiring in most instances less than a single rotation of an actuating shaft) it will be perceived that the present arrangement affords an electrically actuated clamping mechanism which will not be damaged by failure of the operator to turn off the motor after the clamp has been either opened or closed.

To insure that the power means will, at all times, be capable of opening the clamp, after having previously closed it, this invention proposes to embody in the power drive, between the motor and the clamp, a slip-clutch adapted to transmit a substantially greater torque in clamp opening movement than in clamp closing movement.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts through all the views, of which:—

Figure 2:
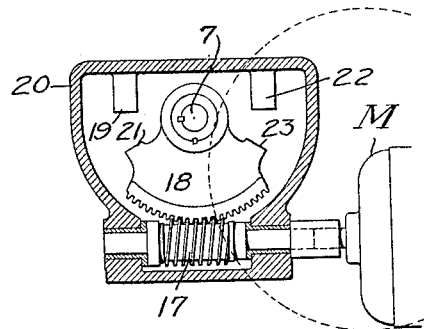
Figure 3:
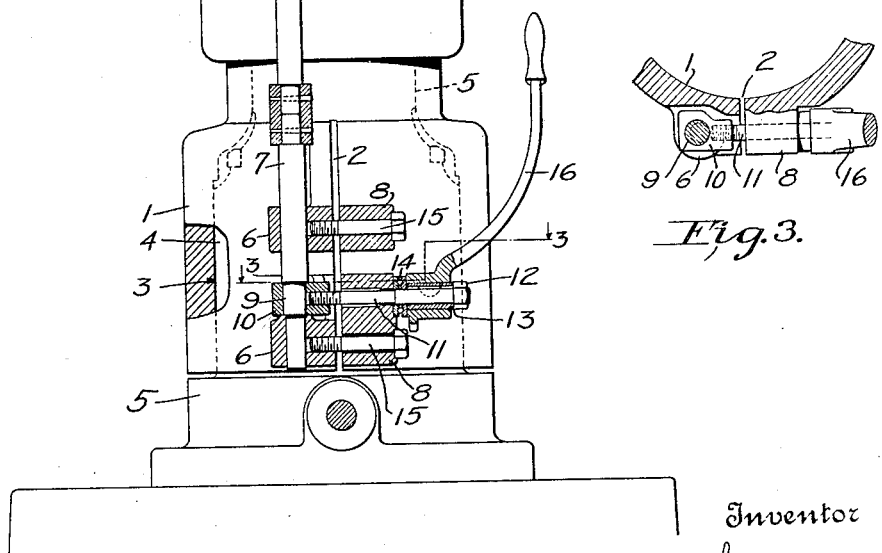
Figure 4:
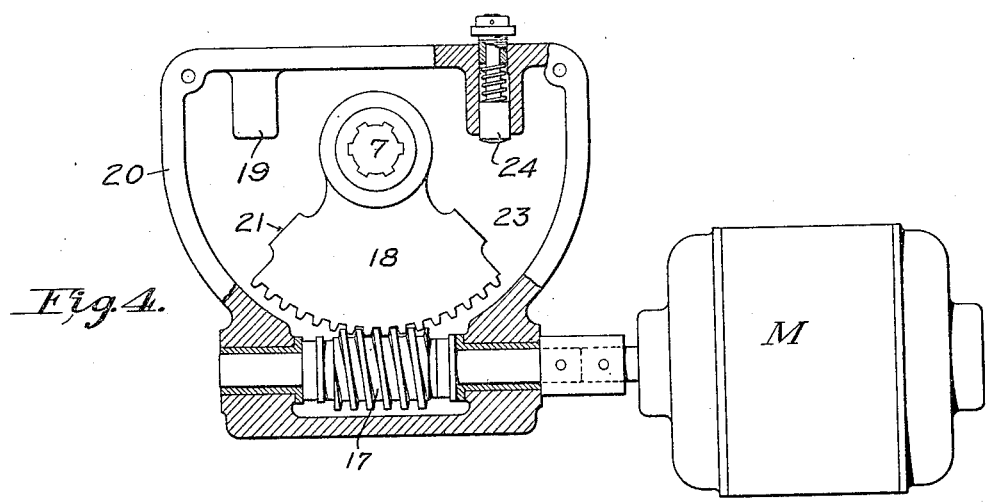
Figure 5:
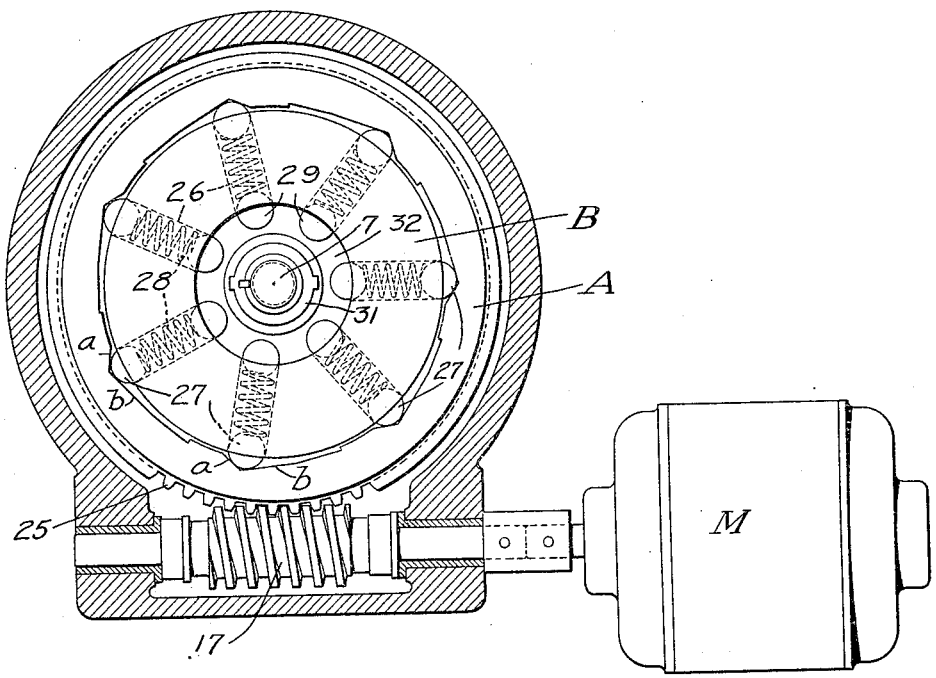

Figure 1 is an elevational view, partly in section, of a portion of a machine tool embodying the present improved clamping means. Fig. 2 is a horizontal sectional view on the line 2—2 of Fig. 1 showing one form of connection between the actuating motor and the clamp actuating shaft later to be referred to. Fig. 3 is a detail horizontal section on the line 3—3 of Fig. 1. Fig. 4 is a view similar to Fig. 2, but showing, in addition, a yielding abutment to cushion the clamp actuating mechanism in its clamp opening movement. Fig. 5 is a view similar to Fig. 2 but showing a discriminating slip clutch located between the actuating motor and the clamp actuating shaft. Fig. 6 is a vertical section on the line 6—6 of Fig. 5 but showing, in addition, adjusting means to vary the tension on the detent elements thereby to vary the torque adapted to be transmitted. Fig. 7 is a section substantially on the line 7—7 of Fig. 6 and Fig. 8 is a diagrammatic layout of one form of electric circuit adapted to effect rotation of the clamp actuating motor and showing also the self-opening push-button switches for selectively so connecting the circuit to the motor as to effect forward or reverse rotation thereof and thereby closing or opening of the clamp element.

Referring more specifically to the drawings, and particularly to Figs. 1, 2 and 3, one form of the invention is disclosed as comprising a contractile and expansile clamp element 1, in the nature of an annular sleeve, split as at 2 and adapted to be contracted to cause its inner surface 3 to grip the outer cylindrical surface 4 of a post or column 5, thereby to lock the two elements together to prevent relative movement therebetween. Projecting from the clamp element, at one side of the split 2, are ears 6 within which is journaled a clamp actuating shaft 7. Complemental ears 8 are also formed on the clamp element 1 at the opposite side of said split. Intermediate the ears 6 the shaft 7 is provided with an eccentric portion 9 surrounded by a strap 10 into which is threaded a draw bolt 11 which projects through one of the ears 8 and has its head 12 connected to the ear 8 through the medium of a bushing 13 and thrust bearing 14. It will readily be perceived that oscillation of the shaft 7 to the position shown in Fig. 3 will move the bolt axially and thereby effect contraction of the clamp element 1, and that oscillation of the shaft from that position will permit the clamp element to open due to the resiliency of the metal therein. Limit bolts 15 passing loosely through the ears 8 and threaded into the ears 6 serve to limit the expansion of the clamp element. A hand lever 16 fixed to the draw bolt 11 may be utilized to rotate said bolt, which, through its threaded connection with the strap 10, will effect relative axial movement between the strap 10 and the bolt-head 12 and thereby contract, or permit to expand, the clamp element 1.

This invention relates primarily to the provision of power means for actuating the clamp element and to that end a suitable prime mover is connected to effect oscillation of the shaft 7. This power means preferably comprises a reversible electric motor M. Inasmuch as the shaft 7 requires only a partial rotation to effect a complete movement of the clamp element it has been found desirable to employ reduction gearing between the motor and the shaft whereby the motor may make a substantial number of rotations while the clamp actuating shaft is making only a partial rotation. This conveniently may be effected by the use of a worm 17 and a cooperating worm wheel, or segment 18, the former being connected to the motor shaft and the latter being fixed to the shaft 7.

The parts are normally so adjusted that, as the eccentric approaches its dead center position as shown in Fig. 3, the clamp element will be tightly gripped upon the member 6 and set up a high resistance which will result in stalling the motor M. If for any reason, such for example as because of wear, the eccentric should pass through its dead center position without completely closing the clamp, an abutment 19, provided by a casing 20 which houses the worm 17 and segment 18, will engage the portion 21 of the segment and prevent further rotation of the segment and shaft 7, also resulting in stalling of the motor. A similar abutment 22 is adapted to engage a portion 23 of the segment, upon complete opening of the clamp, which also effects stalling of the motor.

As hereinbefore stated, the motor M is so wound and insulated as to be capable of being maintained under the influence of the electric current, while stalled, for a period of three minutes or more, without causing overheating or damage to the motor. To insure that the motor will not be maintained under the influence of the electric current for too long a period, the circuit which conducts the current to the motor to effect either forward or reverse rotation thereof is controlled by self opening switches which may be maintained closed only by continuous action of an operator. Fig. 8 shows a 3-phase alternating current circuit suitable for selectively rotating the motor M in forward and reverse directions to effect clamping and unclamping action of the clamp element. This circuit includes three power lines $L^1$, $L^2$ and $L^3$; three motor terminals $T^1$, $T^2$ and $T^3$; a controller designated generally as D and comprising contactors $C^1$ and $C^2$ and miscellaneous other elements common to circuits of this nature. Inasmuch as this circuit is more or less conventional and the structural details thereof, are not claimed in this application, detailed description thereof is deemed unnecessary. Suffice it to say that the circuit is controlled by two push-button switches F and R normally maintained opened as by springs $f$ and $r$ but adapted to be closed, in opposition to the springs, by pressure on the buttons. When the switch F is closed, power lines $L^1$ and $L^2$ are connected with the motor terminals $T^1$ and $T^2$ and the motor is rotated forwardly and the clamp is closed. Immediately the operator removes his finger from the push button the spring $f$ automatically opens the switch and the circuit is broken. The switch R acts in a similar manner to connect the line $L^1$ to terminal $T^2$ and line $L^2$ to terminal $T^1$ thus causing reverse rotation of the motor and unclamping action of the clamp element. The third power line $L^3$ is connected directly to the motor terminal and does not go through the controller D.

Momentary closure of the circuits is sufficient to effect clamping and unclamping action which results in stalling the motor but, as hereinbefore stated, the motor M is so constructed that the operator could, if he were able, maintain the switch closed a relatively long period, say three minutes, without injury to the motor. Thus a perfect safety device is provided.

Fig. 4 shows a modified construction including a yielding abutment 24 comprising a spring pressed plunger carried by the casing 20 and adapted to engage the portion 23 of the segment 18 to cushion the contact of the segment with the casing in its unclamping movement.

Figs. 5, 6 and 7 show still another embodiment of the invention in which the motor is not stalled upon complete closing and opening of the clamp but is permitted to run until the operator removes his finger from the switch button. The clamp actuating shaft 7, however, is limited in its movements to complete clamp closing and clamp opening positions as hereinbefore described. In this embodiment of the invention the worm 17 engages a complete circular worm-gear 25 between which and the shaft 7 is interposed a slip-clutch positive in its action to transmit to said shaft a predetermined torque in each direction of rotation and then to slip. This slip-device comprises two members A and B which are arranged, preferably in nested relation, and which are relatively movable both in a clockwise and in a counter-clockwise direction. One of these members may be utilized as a driver and the other as a follower. In the arrangement shown the female member A is secured upon the worm-gear 25 and serves to drive the male member B, which is keyed to the shaft 7. The member B is provided with a series of radial perforations 26 in which are located a series of detents 27 which are normally pressed radially outward by means of expansile springs 28, which are adjustable as to tension as will presently be described. These detents are shown in the form of hardened balls and they normally engage an annular run-way affording two series of facets $a$ and $b$ provided by the female member B. These facets are inclined in opposite directions and at different angles to a radial line intersecting their point of connection at which point the balls 27 bear, under the action of the springs 28. The facets $a$ are disposed at a more acute angle to a radial line than are the facets $b$. Consequently it requires greater torque to compel the balls to climb the facets $a$ than to climb the facets $b$. As a result of this construction the device will transmit a greater torque without yielding in the one direction than in the other and yet, by virtue of the fact that the balls are normally seated in the pockets formed by the construction, the device is positive in action within certain limits and quite devoid of any tendency to creep.

The device is so arranged that rotation of the member A in a clockwise direction (as viewed in Fig. 5) effects a clamp closing movement of the shaft 7 and rotation in the opposite direction effects an unclamping action. It will therefore be apparent that a substantially greater torque will be transmitted to the shaft 7 to effect unclamping than to effect clamping. This insures against the clamp being so tightly set that the motor would be unable to release it.

It is desirable to be able to adjust the pressure of the detent balls against the raceway and, inasmuch as there is a plurality of detents, it is desirable that the tension may be adjusted uniformly so that each will bear the same load. This is accomplished by locating a member 29 in the nature of a support for the inner end of each spring. The member 29 may, to good advantage, be in the shape of a ball. These balls are, in turn, supported by the conical face 30 of a collar P which is slidably mounted on the periphery of the hub 31 of the male member B.

The end of the collar enters an annular groove 32 which is cut in the outer face of the member B and intersects the radial perforations so as to expose the balls 29 and enable their radial positions, and thereby the tension of the springs 28, to be determined by axially shifting the collar P. The position of the collar is, in turn, determined by a nut 33 acting through a washer 34; the nut being threaded to the extremity 7' of the shaft 7. By turning the nut, the tension of the detents 27 may be regulated at will.

The last described embodiment of the invention also provides a fixed abutment 19 to limit (in case of emergency) the shaft in its clamp closing movement. Likewise a yielding abutment 24 is provided to cushion the movement of the parts in clamp opening movement. These abutments are adapted to be engaged by an arm 35 fixed to the shaft 7.

It is to be understood that the torque transmitted from the member A to the member B is sufficient to effect closing and opening of the clamp element 1 and that after the rotation of the shaft has been arrested, either by tightening of the clamp or by contact of the arm with either of the abutments 19 or 24 a continued rotation of the worm 17 by the motor M will cause the balls 27 to ride up the facets $a$ or $b$, dependent upon the direction of rotation, and the member A may continue to rotate relative to the member B.

It will thus be seen that this invention is well adapted to accomplish the objects enumerated in the foregoing.

Without further analysis, the foregoing will so fully reveal the gist of the invention that others can, by applying current knowledge, readily adapt it for various utilizations by retaining one or more of the features that, from the standpoint of the prior art, fairly constitute essential characteristics of either the general or specific aspects of this invention and, therefore, such adaptations should be, and are intended to be comprehended within the meaning and range of equivalency of the following claims:—

Having thus revealed this invention, I claim as new and desire to secure the following combinations and elements, or equivalents thereof, by Letters Patent of United States:—

1. A clamping mechanism combining a first fixed element; a second contractile and expansile element adapted to engage said fixed element; means to cause contraction and expansion of the second element, said means including an eccentric element operatively connected with the second element; an oscillatory shaft carrying said eccentric element; power means including a reversible electric motor and an electric circuit embodying two self-opening switches to oscillate said shaft first in one direction to effect closing of said clamp and then in the opposite direction to effect opening of said clamp, said power means being adapted to be rendered ineffective when said eccentric element reaches approximately its dead center position in which it effects clamping of said second element to said first element; an emergency stop to arrest the movement of said clamp actuating means should the eccentric inadvertently pass through said dead center position; and resilient means yieldingly to resist the movement of said clamp actuating means in its unclamping movement.

2. A clamp mechanism combining a first fixed element; a second contractile and expansile element adapted to engage said fixed element; means to cause contraction and expansion of the second element, said means including an eccentric element operatively connected with the second element; an oscillatory shaft carrying said eccentric element; power means including a reversible electric motor and an electric circuit embodying two self-opening push-button switches adapted, when held closed alternately by an operator, to permit a flow of current to said motor to effect alternately forward and reverse rotation of said motor and thereby alternate clamping and unclamping movement of said clamp element, said motor being adapted to be stalled by the resistance afforded at the complete clamping and unclamping of said clamp element and being so wired and insulated as to be capable of remaining under the full influence of said current, while stalled for a period of three minutes, without damage to the motor.

In witness whereof, I have hereunto subscribed my name.

DAVID C. KLAUSMEYER.